W. F. KETCHUM.
Harvester.
No. 20,719.
Patented June 29, 1858.
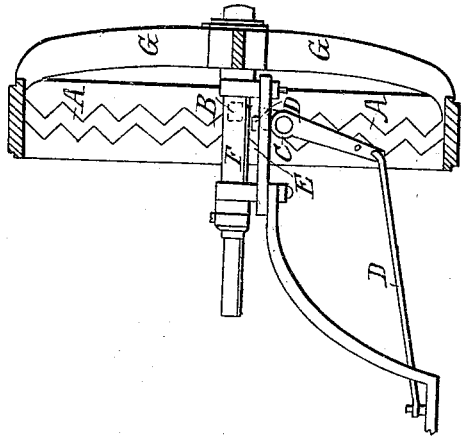
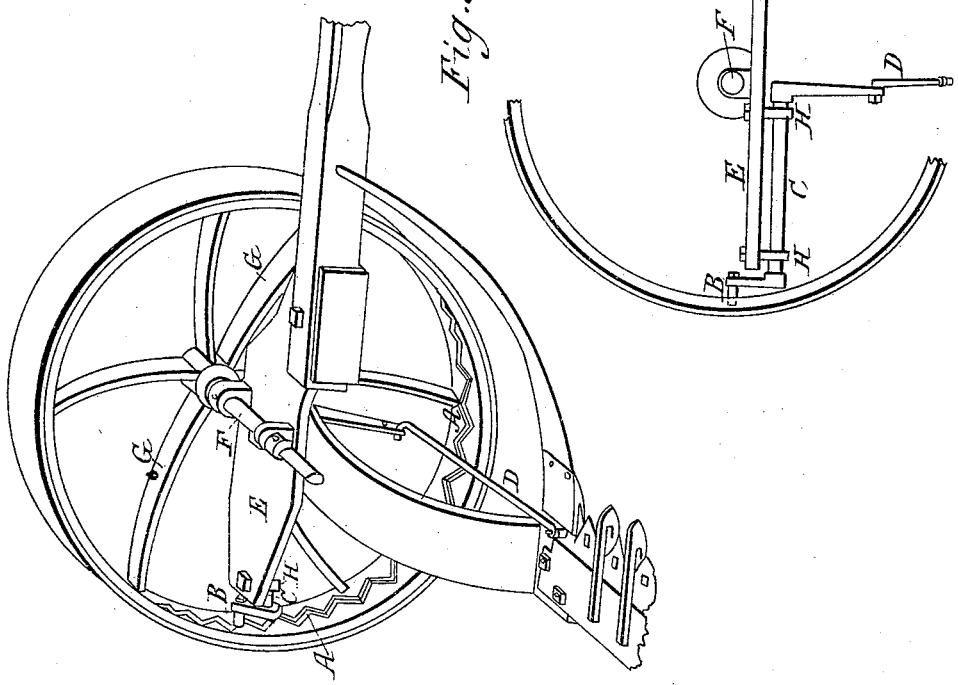

UNITED STATES PATENT OFFICE.

W. F. KETCHUM, OF BUFFALO, NEW YORK.

IMPROVEMENT IN HARVESTERS.

Specification forming part of Letters Patent No. 20,719, dated June 29, 1858.

*To all whom it may concern:*

Be it known that I, WILLIAM F. KETCHUM, of the city of Buffalo, in the State of New York, have invented Improvements in Harvesting-Machines; and I do hereby declare that the following is a full and exact description thereof, reference being had to the accompanying drawings, and to the letters of reference marked thereon.

The nature of my invention will appear from the following description of the construction and operation of the said improvements.

I make a harvester for cutting grass or grain with one main driving-wheel, which is about three feet in diameter, with a rim about five inches wide, and on the side of said wheel opposite to the cutters, with their attachments, I make the plates or spokes connecting the hub with the rim of the wheel convexing outward, so that the hub will be outside of the rim of the wheel, and I connect the said plates or spokes with the outer edge of the rim of said wheel, and the wheel is thus made of a dishing form. By this arrangement I secure or obtain considerable space inside of the rim of said wheel, on the side thereof on which the cutters are placed, for the purpose of placing mainly therein a plate or frame on which I fasten or attach the main shaft, the rock-shaft, and the arm which supports the cutter-bar and its attachments, and for the purpose of securing a proper balance or counterpoise to the cutters and their attachments I place a plate or frame of cast-iron or other equivalents of a form suitable for the purposes herein described, within or mainly within the interior of the said wheel thus constructed, and just below the axle thereof, in a horizontal position. To this frame the pole is attached, and the boxes for the main shaft of the wheel, and for the rock-shaft hereinafter described, are fastened. The coupling or arm holding the cutter-bar is also attached to this plate or frame. This plate or frame is represented in the drawings by E E. The boxing for the main shaft is placed upon the upper side of said plate or frame, and the rock-shaft C C rests in boxes or bearings attached to and depending from the under side of said plate or frame in which it rocks. The rock-shaft is about one and one-half inches in diameter, and is placed in a horizontal position perpendicular to the axis of said main wheel, and extends about one-half of the distance from one side of the wheel to the other.

On the rear end, next to the periphery of the wheel, I attach permanently a crank-arm about four inches long, at right angles to said rock-shaft, extending upward, and the horizontal part of said crank-arm extends into a zigzag groove in the interior of said driving-wheel, upon which a friction-roller is placed, and the horizontal part of the said crank-arm should be located in or nearly in a line with the radius of the wheel. Upon the other end of this rock-shaft is permanently attached an arm about eight inches long, extending downward, to which the pitman is attached. The length of the rock-shaft should be so adjusted that this arm will be on a line with the cutters, so that the pitman may be attached thereto.

The main or driving wheel is cast or made with a zigzag groove upon the inside of the rim, and by means of this arrangement above described a reciprocating motion is given to the cutters.

It is obvious that the rim of the main wheel may be made broad enough to allow sufficient space for most of the purposes aforesaid, without giving a dishing form to the connections between the hub and the rim of the wheel; but this I consider an inferior mode of constructing the said wheel.

Figure 1 in the drawings annexed is a perspective view of said machine. Fig. 2 is an end view of a part of the same; and Fig. 3 is a side sectional view of a part of said machine, showing the plate or frame E E and the rock-shaft C.

Letter G represents the plates or spokes of the wheel. Letter A represents the zigzag groove in the interior of the wheel. Letter B represents the friction-roller. Letter C represents the rock-shaft, with its arms. Letter D represents the pitman. Letters E E represent the plate or frame. Letter F represents main shaft of driving-wheel. Letter H represents the boxes or bearings below the plate or frame in which the rock-shaft rests.

Having thus described my improvements, I claim as my invention—

1. The plate E E as a substitute for the usual main frame, placed mainly within the rim of a driving-wheel whose hub and spokes or supporting-plates are placed at the outside laterally of the rim, as described.

2. The internal zigzag groove, in combination with the rock-shaft, with its arms for vibrating the cutters, the whole arranged and operating as described.

3. Supporting the boxes for the main shaft and the rock-shaft upon a plate, or its equivalent, placed mainly within the rim of the driving-wheel, as set forth.

W. F. KETCHUM.

Witnesses:
W. P. N. FITZGERALD,
I. M. MURRAY.